(12) United States Patent
Musial (10) Patent No.: US 7,369,507 B1
(45) Date of Patent: May 6, 2008

(54) PROCESS FOR LEARNING THE BASIC FINITE AUTOMATION OF A PROTOCOL IMPLEMENTATION

(75) Inventor: Marek Musial, Berlin (DE)

(73) Assignee: Tektronix, Inc., Beaverton, OR (US)

(*) Notice: Subject to any disclaimer, the term of this patent is extended or adjusted under 35 U.S.C. 154(b) by 1221 days.

(21) Appl. No.: 09/602,418

(22) Filed: Jun. 23, 2000

(30) Foreign Application Priority Data

Jun. 25, 1999 (DE) ................................ 199 29 166

(51) Int. Cl.
*H04J 3/14* (2006.01)
(52) U.S. Cl. ............................ 370/244; 707/6; 714/37
(58) Field of Classification Search ........ 370/241–253; 707/6; 703/2; 714/37, 38, 39
See application file for complete search history.

(56) References Cited

U.S. PATENT DOCUMENTS

| | | | | |
|---|---|---|---|---|
| 5,483,470 A * | 1/1996 | Alur et al. | ...................... | 716/6 |
| 5,519,647 A | 5/1996 | DeVille | | |
| 5,606,690 A * | 2/1997 | Hunter et al. | .................. | 707/5 |
| 6,059,837 A * | 5/2000 | Kukula et al. | ................ | 703/27 |
| 6,104,835 A * | 8/2000 | Han | ........................... | 382/225 |
| 6,185,516 B1 * | 2/2001 | Hardin et al. | .................. | 703/2 |
| 6,346,879 B1 * | 2/2002 | Peled | .......................... | 340/500 |
| 6,363,380 B1 * | 3/2002 | Dimitrova | ..................... | 707/6 |
| 6,785,730 B1 * | 8/2004 | Taylor | ........................ | 709/230 |
| 6,819,863 B2 * | 11/2004 | Dagtas et al. | ................. | 386/46 |

FOREIGN PATENT DOCUMENTS

| | | |
|---|---|---|
| GB | 2302487 | 1/1997 |
| WO | WO 98/11702 | 3/1998 |
| WO | WO 98/12852 | 3/1998 |

OTHER PUBLICATIONS

"Useful Equations for Linear Regression", Jan. 26, 1999, Internet.
Dr. L. Absillis & Prof. M. Goossens, "Advanced Protocol Analysers", Apr. 18, 1994.
K. Saleh et al, "Recovery of Communications Protocol Design from Protcol Execution Traces" 1996 IEEE.

* cited by examiner

*Primary Examiner*—Min Jung
(74) *Attorney, Agent, or Firm*—Francis I. Gray; Michael A. Nelson (57) ABSTRACT

The present invention relates to a process for learning a basic finite automaton of a protocol implementation, which process is characterized by the following steps: a) categorizing the times (1, 2, 3) within an example communication into equivalence classes and b) using said equivalence classes as states of the learned automaton. The invention further relates to a process for learning arithmetic classification rules for feature vectors from a training set of positive examples, which process is characterized by the following steps: a) forming derived features (y–v; x–z), based on statistical measures, in the form of arithmetic terms; b) formulating logic conditions (x=w+1, y=v+1, z=x) on the numerical values of the features from the training set or the derived features.

14 Claims, 5 Drawing Sheets

| BYTE | | |
|---|---|---|
| 1 – 2 | 42 (ACK) | a |
| 3 – 6 | TELEPHONE NUMBER RECEIVER | x |
| 7 – 10 | TELEPHONE NUMBER SENDER | y |

FIG.4

$$\begin{matrix} a & b & a & b & a & c & b & a & c & b & a & b & a & b & a \\ 1 & 2 & 3 & 4 & 5 & 6 & 7 & 8 & 9 & 10 & 11 & 12 & 13 & 14 \end{matrix}$$

| v | w | x | y | z | y-v | x-z |
|---|---|---|---|---|-----|-----|
| 42 | 17 | 18 | 43 | 18 | 1 | 0 |
| 100 | 307 | 308 | 101 | 308 | 1 | 0 |
| ... | ... | ... | ... | ... | ... | ... |

PROCESS FOR LEARNING THE BASIC FINITE AUTOMATION OF A PROTOCOL IMPLEMENTATION

BACKGROUND OF THE INVENTION

The present invention relates to communication protocols, and more particularly to a process for learning the basic finite automaton of a protocol implementation.

Figure 1:
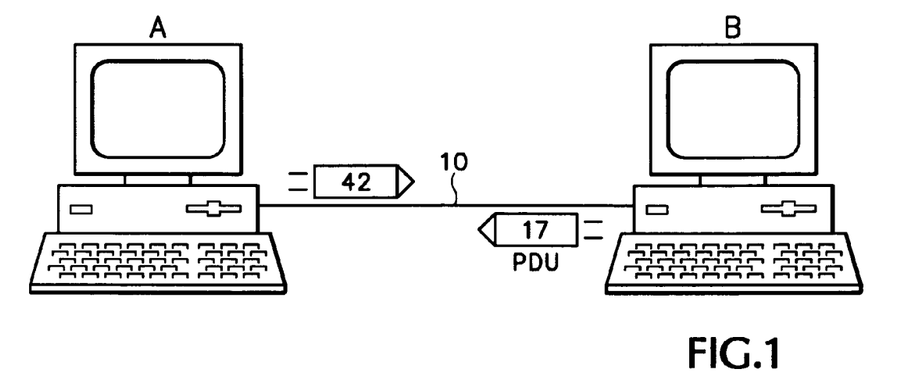
FIG. 1 is a block diagram view of a prior art arrangement of devices.

Communication partners are known to exchange data with one another in accordance with a communication protocol. An arrangement of devices for performing a data exchange in this manner is illustrated in FIG. 1. Communication partners A and B communicate with one another via a communication medium 10, such as an electrical line, by exchanging messages or protocol data units (PDUs) with one another in accordance with the communication protocol. The communication protocol constitutes a complete set of rules for the required behaviour of each of communication partners A and B. The communication partners A and B are entities in the sense of the OSI reference model which is described in detail in "ISO. Information Processing Systems—Open Systems Interconnection—Basis Reference Model" International Standard ISO/IS 7498, ISO, 1984. The appropriate and common concept for defining communication protocols is the extended finite state machine (EFSM) as described in the book by D. Hogrefe (Estelle, LOTOS und SDL: "Standard-Spezifiktionssprachen für verteilte Systeme", Springer Compass. Springer Verlag-Berlin, Heidelberg, N.Y. etc. 1989). It is a generalisation of the finite state machine (FSM) explained in the "Proceedings of the 1994 International Symposium on Software Testing and Analysis" (ISSTA), ACM SIGSOFT Software Engineering Notes, special issue, pages 109 to 124, August 1994.

What is required for digital communication to function smoothly is that all communication partners involved behave in conformity with common rules, the so-called protocols. Owing to the openness, diversity, complexity and bandwidth of modern communication systems, the development, standardisation and description of protocols have constantly been gaining in importance. However, error sources are proliferating at the same rate, resulting in more or less major interferences in communication systems. Among the typical error sources encountered again and again in modern broadband communication systems are:
  malfunctions or error functions due to the use of protocols or protocol variants which ought not to be used in the given context of a system installation;
  malfunctions or error functions due to configurable protocol parameters which were set to values incompatible with the given context of a system installation;
  malfunctions or error functions due to overload situations forcing individual components of the communication system to discard data.

Experience has shown that all the efforts towards ensuring the smooth functioning of communication-relevant hardware and software before their market introduction by means of suitable development processes and active test procedures is not successful in each and every case. This creates the need for troubleshooting aids which are used in a telecommunications system on the fly and are capable of detecting malfunctions or error functions, of attributing them to a system component and of providing hints on how to eliminate them.

What existing tools for on-the-fly measurements, usually referred to as protocol analyzers, have in common is that they are not capable of validating the entire communication behaviour with respect to the desired behaviour, instead requiring a considerable amount of manual testing. Consequently, there is a considerable potential here for automating rather unpleasant manual search work.

BRIEF SUMMARY OF THE INVENTION

It is therefore the object of the present invention to provide a process which allows the desired behaviour, which serves as a basis for verifying a communication, to be made available to an analyzer as fast and inexpensively as possible. In particular, this is also possible when the basic protocol does not exist in the form of a formal, machine-compatible or machine-readable specification.

In general, a test algorithm for a concrete communication protocol cannot be developed completely automatically even if a machine-readable protocol specification is available, but rather requires a certain amount of human design work. The solution of the invention offers the advantage that, if there are not enough resources, the use of a machine-based learning process allows test algorithms to be developed almost without any human design work. In view of the very large number of protocols and protocol variants already in existence, of which not every single one is actually worth a significant amount of development work for a test machine, this is especially advantageous.

In the ever faster further development of communication systems and standards, one frequently observes a co-existence of internationally standardised protocols and proprietary developments which are to fulfil existing needs as fast as possible, before any competitors do, and even more so before the conclusion of a usually lengthy standardisation procedure. Often formal specifications for such proprietary protocol variants may only be obtained, if at all, at a high price from the manufacturer. The present invention allows the desired behaviour to be determined and made available for analysis even without any formal specification.

In a first aspect of the invention, a process for learning a basic finite automaton of a protocol implementation has the following steps: First, all the times within an example communication are categorized into equivalence classes. Subsequently, the equivalence classes are employed as states of a learned automaton. This allows the sequence of message types to be learned, regardless of the message contents. Consequently, the states and state transitions of a finite automaton are learned.

In case an example communication has PDU (Protocol Data Unit) types, a similarity rate for each pair of times within the example communication is calculated in a particularly advantageous manner for forming the equivalence classes, the similarity rate depending on the PDU type sequence whose length is coincident for and surrounds both times. The similarity relation may be defined between two times, each within the example communication, by means of a lower bound on the value of the similarity rate such that two times fulfil the similarity relation if the similarity rate between these two times is larger than or equal to the lower bound. An equivalence relation for forming the equivalence classes may preferably be calculated by forming the transitive hull of a similarity relation between the times within the example communication.

Preferably, the PDUs of the example communication are entered as state transitions of the learned automaton, i.e., as a transition from the state whose equivalence class includes the time immediately prior to the PDU in question to the state whose equivalence class includes the time immediately after the PDU in question, marked with the PDU type in question, wherein transitions which are identical as far as starting and sequential states and PDU type are concerned are only entered once.

The above mentioned procedural steps or combinations thereof may be performed several times for overlapping partial sections of the example communication, with the similarity relations of two overlapping partial sections each being united to form a common equivalence relation.

In order to also learn indications about the message contents in the form of context rules about message attributes, the present invention proposes a process for learning arithmetic classification rules for feature vectors from a training set having positive examples wherein first of all features derived from statistical measures are created in the form of arithmetic terms, and subsequently logic conditions are formulated on the numerical values of the features. Positive examples in this case are examples of error-free communication as opposed to examples in which protocol rules are violated (negative examples). In the present application, the training set is the example communication of a protocol machine consisting of PDUs, with the logic conditions constituting the rules for the numerical PDU field contents of a PDU sequence.

Particularly preferred is the formation of the derived features on the basis of correlation and regression coefficients on the training set for each possible feature pair, with the value of a derived feature for each training example being calculated as a sum, product, quotient or difference of two already present features or as a product of a present feature and a constant. When the conditions are being formulated, conspicuous accumulations of the values of the feature included in the training set or of the derived feature in a numerical value or within a numerical interval may be taken into consideration, the conspicuous accumulation being preferably defined in that it maximizes the quotient of the width of the smaller one of the two gaps immediately adjacent to the numerical interval in which there are no values of the feature in question, and of the width of the largest gap within the numerical interval in which there are no values of the feature in question. Plural subclasses of the training set may be constructed by organizing the logic conditions in a disjunction of clauses, in which case one clause constitutes a conjunction of one or plural logic conditions and describes one subclass each of said training set. For characterizing the entire training set, a selection of the clauses constructed may be performed such that all elements, if possible, of the training set are selected by at least one of the clauses, and as many as possible of them by exactly one clause.

Further objects, advantages and novel features of the present invention are apparent from the following detailed description when read in conjunction with the appended claims and attached drawing.

DETAILED DESCRIPTION OF THE INVENTION

Figure 2:
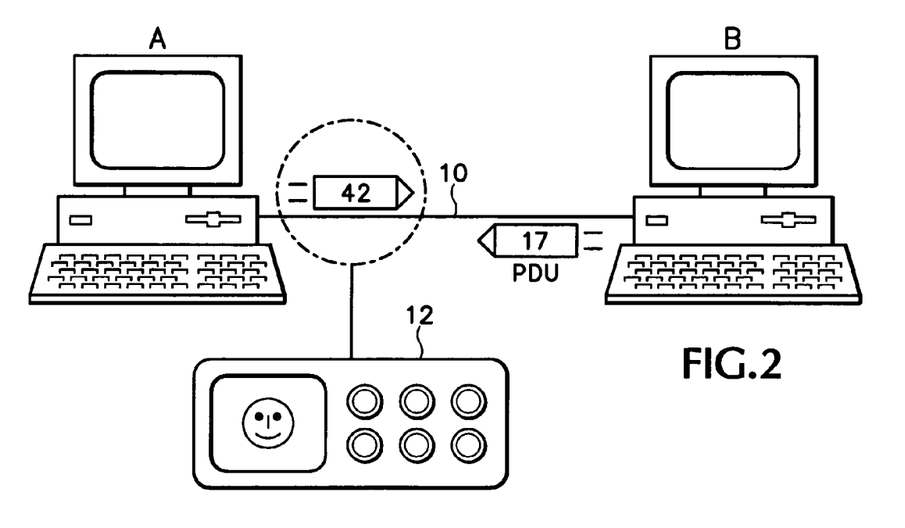
FIG. 2 is a block diagram view of an arrangement of devices for performing the process of the invention.

As seen in FIG. 2 in which items identical with those of FIG. 1 are marked with identical reference characters, a trace analyzer 12 is coupled to the communication medium 10 so as to detect the data exchanged between the communication partners A and B. In doing so, the trace analyzer 12 reads any exchanged messages without changing them or otherwise affecting the ongoing communication between A and B. Although the trace analyzer knows the various message types of the communication, i.e., the protocol syntax, it has no knowledge of the protocol structure, i.e., how the messages are structured and how the message types are employed by the communication partners involved for performing communications. The trace analyzer 12 does not know reference protocols.

Figure 3:
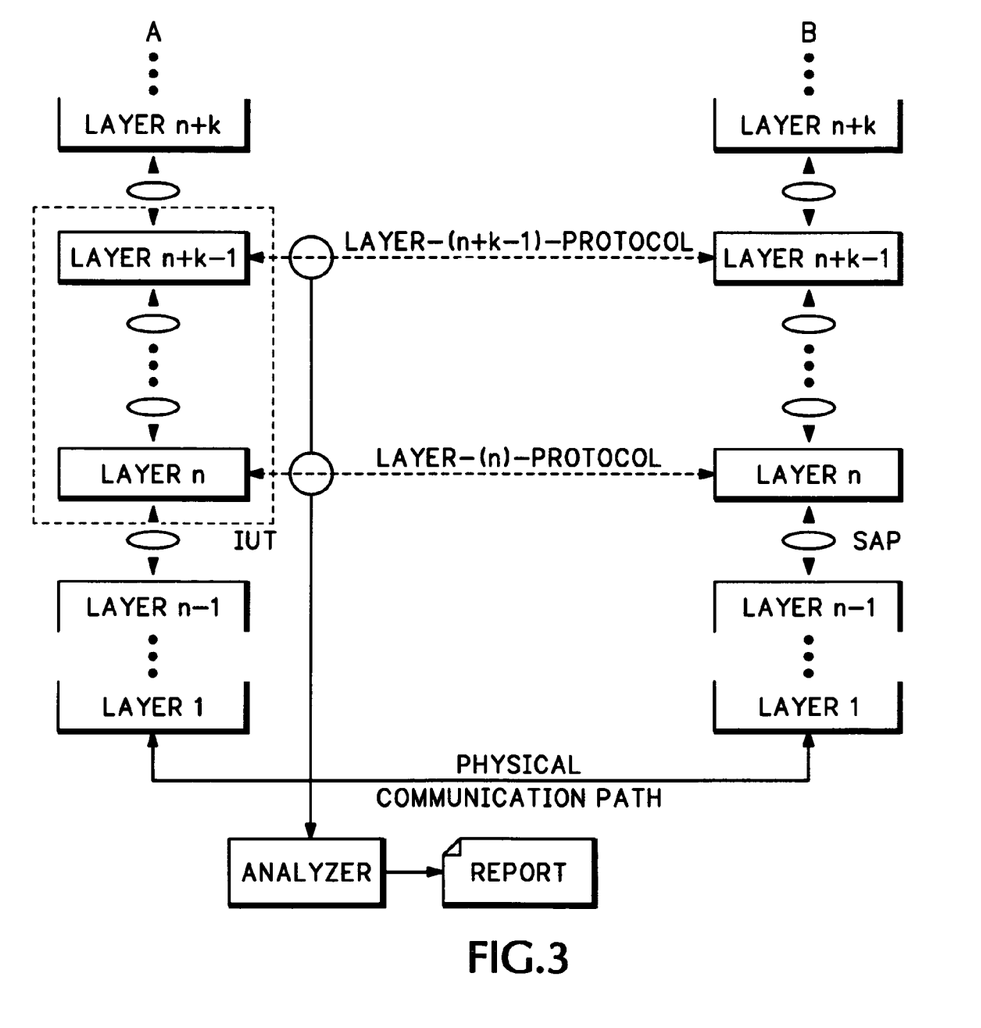
FIG. 3 is a view of the logic context of a trace analysis according to the present invention.

FIG. 3 shows the logic inclusion of the analyzing algorithm in the communication process. The analyzing algorithm reads the PDUs of a layer n, $n \geq 1$, from the protocol stack and, in a manner described hereinafter, derives rules from this observation which describe the correct protocol behaviour. The prerequisite for this is that all communication participants and the lower protocol layers responsible for the transport of the layer n PDUs behave in accordance with the protocol. In this case, however, the trace analyzer 12 does not receive any information on the primitives exchanged at the service access points.

Figure 4:
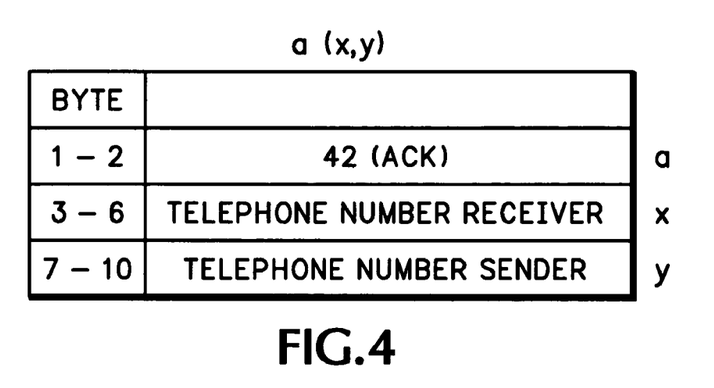
FIG. 4 is a view of how a PDU is composed of PDU type and message attributes according to the present invention.

FIG. 4 is an exemplary view of the structure of a PDU a(x, y). Here, a designates the message type, while x and y relate to message attributes, i.e., data. In the illustrated example, bytes one and two specify the number 42 which indicates that a is of the ACK type. x, i.e., bytes three to six, designates the telephone number of the receiver, while y, i.e., bytes seven to ten, designates the telephone number of the transmitter.

Figure 5:
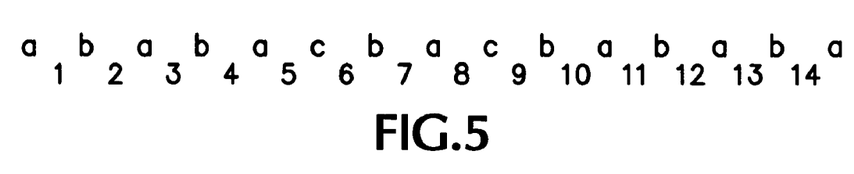
FIG. 5 is a view of an example communication, restricted to the PDU types, with times defined therebetween according to the present invention.
Figure 6:
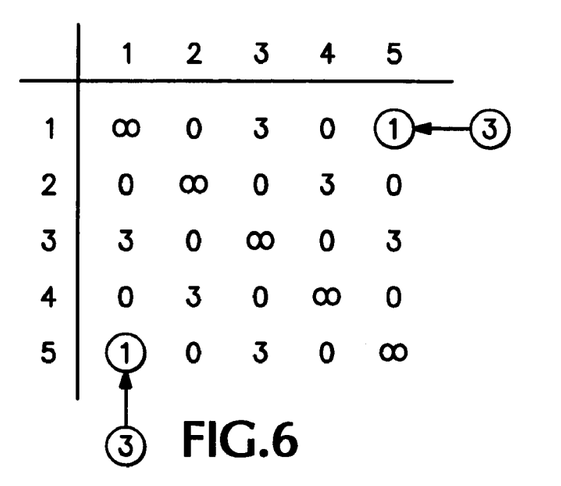
FIG. 6 is a view of a similarity matrix established for five times of the example communication of FIG. 5 according to the present invention.

FIG. 5 is a view of an example communication between entity A and entity B of FIG. 2. In this first step, first of all only the message types are of interest, whereas the message attributes are not considered for the time being. Between the message types times are defined, here times 1 to 14. A similarity matrix, see FIG. 6, is then established in such a way that at the top and on the left, the times of the example communication are entered. Between every two times within the example communication, the value is entered into the similarity matrix which is coincident with the length of the PDU type sequence that is coincident for and surrounds both times.

For the sake of clarity, FIG. 6 does not show the similarity matrix for all 14 times, but merely for the first five times. Since the respective times are directly coincident with themselves in all preceding and all subsequent times, the diagonal is filled in with "infinity". Since the similarity matrix is symmetrical to the diagonal, only the top right-hand half is dealt with in more detail hereinafter.

Consider the entry at the position first row, second column: The precursor of time 1 as shown in FIG. 5 is an a, while the precursor of time 2 is a b. The successor of time 1 is a b, while the successor of time 2 is an a. Therefore, the value to be entered into the matrix is 0.

The value in the first row, third column is obtained as follows: The precursor of time 1 is an a just like the precursor of time 3. What follows after time 1 just like after time 3 is the sequence b a. Consequently, the value to be entered into the matrix is 3. The remaining values of the similarity matrix are obtained in a similar manner.

Figure 7:
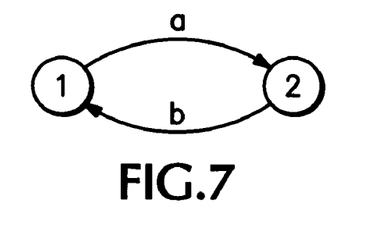
FIG. 7 is a view of a finite automaton resulting from the similarity matrix of FIG. 6 according to the present invention.

Now, there are two approaches of how to derive equivalence classes from the similarity matrix:

In accordance with a first approach, all similarities above a certain threshold are sought for the purpose of transforming the similarity matrix into an equivalence matrix, and the relevant times are grouped together to give states of a finite automaton, until all such similarities exist between times of the same state. For example, in case of a lower threshold of 1, the times 1, 3 and 5 may be combined to give a state 1 and, as a countermove thereto, also the times 2 and 4 may be combined to give a new state 2. Then, the PDUs of the example communication are entered as state transitions of the learned automaton, i.e., as a transition each from the state whose equivalence class includes the time immediately prior to the PDU in question to the state whose equivalence class includes the time immediately after the PDU in question, marked with the relevant PDU type. The state graph of the associated finite automaton and thus of the associated protocol is shown in FIG. 7.

In accordance with another process, the similarity matrix is multiplied by itself until a final state, the so-called equivalence matrix, is obtained, from which equivalence classes may then be derived. However, the matrix multiplication is changed to such an effect that additions are replaced with the formation of the maximum, and multiplications are replaced with the formation of the minimum of the two input values. In accordance with this approach, the entries in the first row, fifth column, and in the fifth row, first column of the similarity matrix of FIG. 6 are replaced with a 3.

In accordance with a third approach, an equivalence relation for the formation of an equivalence class is calculated by forming the transitive hull of a similarity relation between the times within the example communication.

For the purpose of determining equivalence classes, however, another approach is to determine equivalence matrices for different threshold values and then use the threshold at which the number of states is below a predetermined value.

Figure 8:
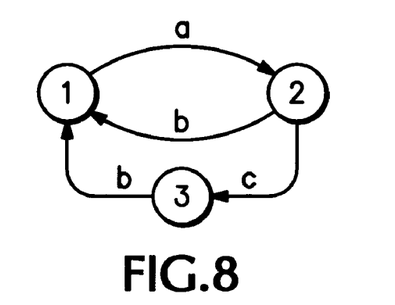
FIG. 8 is a view of a finite automaton resulting from the complete example communication of FIG. 5 according to the present invention.

If all 14 times of the example communication of FIG. 5 are evaluated, the result is the state graph shown in FIG. 8, i.e., the finite automaton illustrated in FIG. 8.

Figure 9:
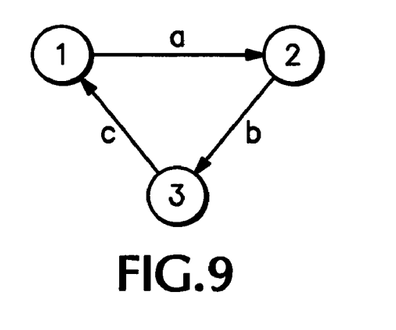
FIG. 9 is a view of a minimum automaton resulting from the example communication of FIG. 5 with a maximum threshold according to the present invention.
Figure 10:
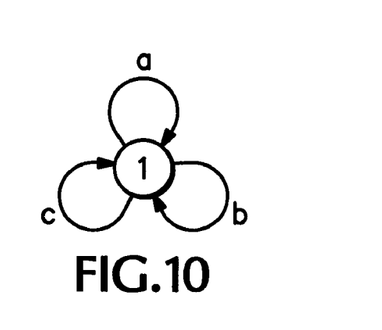
FIG. 10 is a view of a maximum automaton resulting from the example communication of FIG. 5 with a minimum threshold according to the present invention.

FIGS. 9 and 10 show the two extremes for the finite automaton which result as a function of the selection of the threshold. FIG. 9 shows the minimum automaton for a selected maximum threshold, and FIG. 10 shows the maximum automaton for a selected minimum threshold. Especially with a view to keeping computational time down, the respective procedural steps may be performed plural times for overlapping partial sections of the example communication, with the similarity relations of every two overlapping partial sections being united to form a common equivalence relation. A preferred overlapping range is 30%-50% overlap.

In a second aspect of the invention, the next step is to learn the context rules for the message attributes. Irrespective of the embodiment illustrated herein, this second aspect of the invention may also be applied to the sequence of message types, without any previous first step (see above), if the associated message attributes are to be learned.

Figure 11:
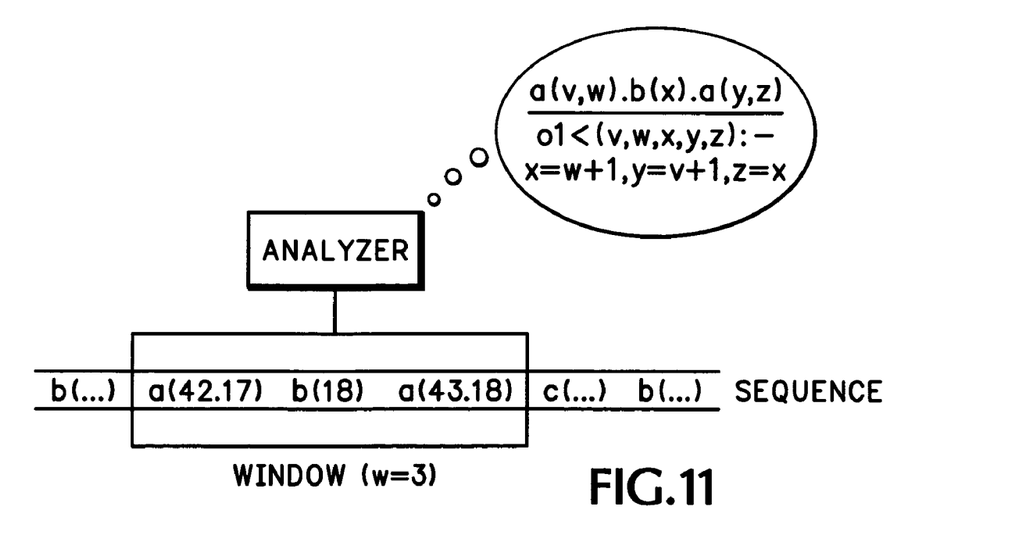
FIG. 11 is a view illustrating a procedure for learning the message attributes according to the present invention.

As shown in FIG. 11, the symbol sequence, i.e., the sequence of message types, which is the starting point here, is known from the previously determined finite automaton. A window is then laid over the example communication, preferably of a width of w=3 to 5. For this purpose, one must keep in mind that for detecting relationships between remote PDUs, larger windows are chosen; however, the larger a window size becomes, the smaller is the number of features derivable therefrom. In the example which follows, the message attributes of the first PDU of type a are v and w, of the first PDU of type b is x and of the second PDU of type a are y and z, cf. FIG. 11.

Figure 12:
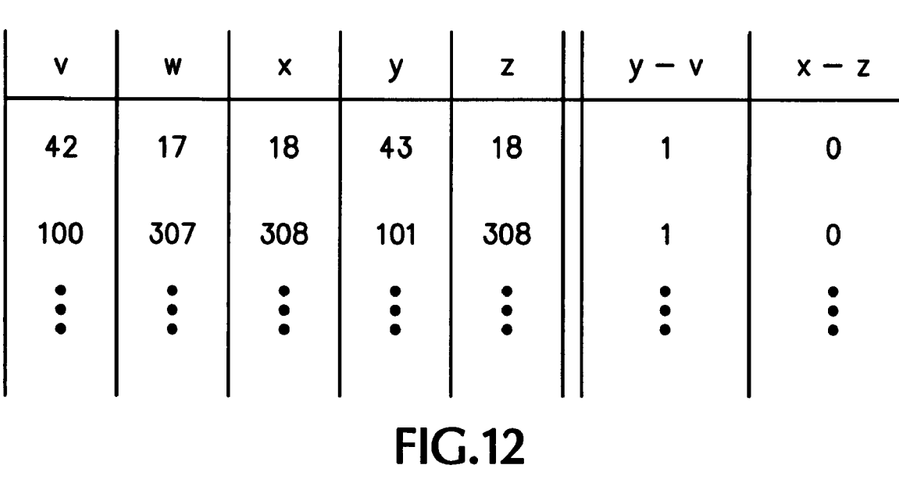
FIG. 12 is a view of a table including features of the example communication of FIG. 11 as well as features derived therefrom according to the present invention.

The left half of FIG. 12 shows a compilation of the message attributes v w x y z as an example for the window (line 1) shown in FIG. 11, on the one hand, and for a different window (line 2), on the other hand. The right half of FIG. 12 shows features derived from the message attributes v to z, that is y−v and x−z, to be more precise. The derived features are preferably formed on the basis of correlation and regression coefficients on the example communication for each possible feature pair, wherein the value of a derived feature may be calculated as a sum, product, quotient or difference of two already present features, or as a product of a present feature and a constant. The term "present features" is intended to also cover features derived in a previous operation. The correlations to be examined are derived in an advantageous manner from common protocols.

On the basis of the derived features, a so-called OK criterion may then be formulated, as shown in the top right-hand portion of FIG. 11, i.e., the sequence of five message attributes v, w, x, y, z is OK, i.e., conforms to the protocol, if the following rules are fulfilled. Consequently, the OK criterion for the example communication a(v,w) b(x) a(y,z) shown in FIG. 11 is:

ok(v,w,x,y,z):–

$x=w+1, y=v+1, z=x$

In addition to the conjunctive operation illustrated in the example, disjunctive operations may also be considered. This means that plural subclasses of the training set may be constructed by organizing the logic conditions in a disjunction of clauses, wherein one clause constitutes a conjunction of one or plural logic condition(s) and describes a subclass each of the training set.

Figure 13:
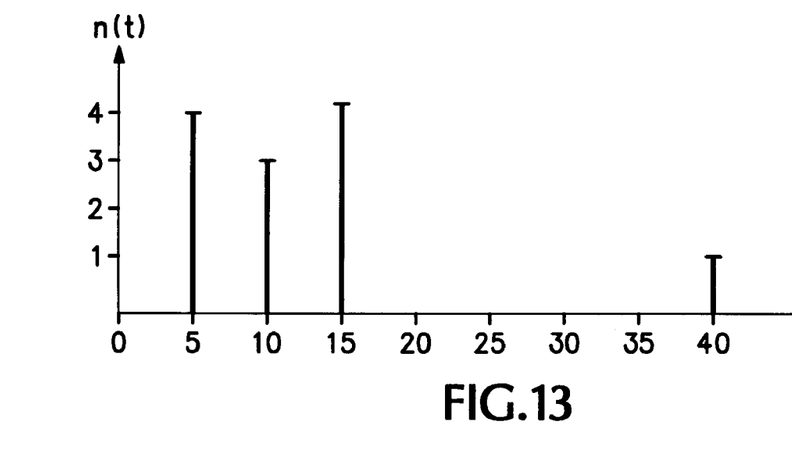
FIG. 13 is a view for formulating conditions based on conspicuous accumulations of a numerical value for a certain feature according to the present invention.

For formulating the conditions, conspicuous accumulations of the values of a feature present in the training set or of a derived feature in a numerical value or within a numerical interval may be taken into consideration. FIG. 13 shows the accumulation of numerical values regarding a message attribute t. As shown, in an example communication t has the value 5 four times, the value 10 three times, the value 15 four times and the value 40 once. This gives rise to the assumption that there is an accumulation in the interval between 5 and 15. A conspicuous accumulation may be defined in particular in that it maximizes the quotient between the width of the smaller one of the two gaps immediately adjacent the numerical interval in which there are no values of the feature in question, and the width of the largest gap within the numerical interval in which there are no values of the numerical interval in question.

For characterizing the entire training set, a selection of the constructed clauses may be conducted such that all elements, if possible, of the training set are selected by at least one of the clauses, and as many as possible of them by exactly one clause.

What is claimed is:

1. A method of learning a finite automaton of a protocol implementation of a communication system comprising the steps of:
   a) grouping times within an example communication including PDU (Protocol Data Unit) types together as equivalence classes; and
   b) using the equivalence classes as states of the finite automaton;
   the grouping step comprising the steps of:
   calculating a similarity value between every two times within the example communication to form a similarity matrix, the similarity values being dependent on the length of the PDU type sequence which is coincident for and surrounds both times; and
   forming the equivalence classes from the similarity matrix.

2. The method as claimed in claim 1 wherein the forming step comprises the step of transforming the similarity matrix into an equivalence matrix by means of a lower threshold for the similarity values such that the similarity values are converted into states and the times are grouped together by state to form the equivalence classes.

3. The method as recited in claim 1 wherein the forming step comprises the steps of:
   forming a transitive hull for the similarity matrix between two times within the example communication to calculate an equivalence relation; and
   obtaining the equivalence classes from the equivalence relation.

4. A method of learning a finite automaton of a protocol implementation of a communication system comprising the steps of:
   a) grouping times within an example communication including PDU (Protocol Data Unit) types together as equivalence classes; and
   b) using the equivalence classes as states of the finite automaton;
   the using step comprising the step of entering each PDU (Protocol Data Unit) of the example communication as a state transition of the finite automaton, the state transition being a transition from the state whose equivalence class includes the time immediately prior to the PDU to the state whose equivalence class includes the time immediately after the PDU marked with the PDU type.

5. The method as recited in claim 4 further comprising the step of performing the preceding steps several times for overlapping partial sections of the example communication, with the similarity matrix of two overlapping partial sections each being united to form the similarity matrix for the example communication.

6. A method of learning a finite automaton of a protocol implementation of a communication system using an example communication, the finite automaton having basic protocol states and the state transitions of the finite automaton being marked with an appropriate Protocol Data Unit (PDU) type, comprising the steps of:
   a) defining times in the example communication between every two PDUs which occur in sequence;
   b) calculating a similarity value between every two times as defined in a) to form a similarity matrix, which similarity value indicates the sum of the number of PDU types coincident for and surrounding both times;
   c) transforming the similarity matrix to an equivalence matrix by means of a lower threshold for the similarity values calculated according to b), such that two times fulfill an equivalence relation for an equivalence matrix if the similarity values between these two times is larger than or equal to the lower threshold;
   d) forming a transitive hull for the equivalence matrix defined according to c), the transitive hull constituting equivalence classes on times according to a);
   e) defining each equivalence class of the equivalence relation according to d) as a state of the finite automaton;
   f) entering the PDUs of the example communication as state transitions of the finite automaton, the state transitions being a transition from the state whose equivalence class according to e) includes the time immediately prior to the PDU in question to the state whose equivalence class according to e) includes the time immediately after the PDU in question marked with the PDU type of the PDU in question, with transitions that are identical as far as starting and sequential states and PDU type are concerned being only entered once.

7. The method as recited in claim 6 wherein steps a) to f) are performed several times for overlapping partial sections of the example communication, with the equivalence matrices according to c) of two overlapping partial sections each being united and the state-forming equivalence matrix being calculated in analogy to d) by means of the union of the equivalence matrices.

8. A method of learning arithmetic classification rules for features of a finite automaton of a protocol implementation of a communication system from a training set having positive examples comprising the steps of:
   a) forming derived features from the training set on the basis of statistical measures in the form of arithmetic terms; and
   b) formulating logic conditions on numerical values of the group consisting of the features from the training set and the derived features;
   the training set being an example communication composed of Protocol Data Units (PDUs) of a protocol machine and the logic conditions being the rules for the numerical PDU field contents of a sequence of PDUs.

9. The method as recited in claim 8 wherein the forming step comprises the step of forming the derived features on the basis of correlation and regression coefficients on the training set for each possible pair of features, with the value of the derived feature being calculated from two features from the training set or from one feature from the training set and a constant.

10. The method as recited in claim 9 wherein the formulating step comprises the step of taking the conspicuous accumulations of the values of a feature from the training set or a derived feature in a numerical value or within a numerical interval into consideration to establish the logic conditions.

11. The method as recited in claim 10 wherein the conspicuous accumulation is defined in that it maximizes the quotient of the width of the smaller one of two gaps immediately adjacent to the numerical interval in which there are no values of the feature in question, and the width of the largest gap within the numerical interval in which there are no values of the feature in question.

12. The method as recited in claim 11 further comprising the step of:
   constructing plural subclasses of the training set by organizing the logic conditions in a disjunction of clauses, with one clause constituting a conjunction of one or plural logic condition(s) and describing a subclass each of said training set.

13. The method as recited in claim 12 further comprising the step of conducting a selection of the constructed clauses for characterizing the entire training set such that all elements, if possible, of the training set are selected by at least one of the clauses, and as many as possible of them by exactly one clause.

14. A method of learning arithmetic classification rules for features of a finite automaton of a protocol implementation of a communication system from a training set having exclusively positive examples, the method being used for learning rules for numerical Protocol Data Unit (PDU) field contents of a sequence of PDUs which correspond to a specific partial path in a finite automaton of protocol basic states and PDU types, comprising the steps of:
   a) interpreting each component of a feature vector as the expression of an attribute, with the number of attributes present at the beginning corresponding to the dimension of the feature vector;
   b) forming new, derived attributes for each possible attribute pair on the basis of correlation and regression coefficients on the training set, with the value of a derived attribute for each feature vector being calculated from already present attribute values of the feature vector, namely as a sum, product, quotient or difference of two already present attributes, or as a product of a present attribute and a constant, in the case of a calculation from two present attributes, the attributes considered in the calculation being selected for maximum correlation with a third attribute and the arithmetic operation for maximum correlation of the derived attribute with the same third attribute, and in the case of a multiplication with a constant, an attribute with a particularly high correlation with a second attribute being multiplied by the linear regression coefficient of the attribute pair in such a manner that the resulting derived attribute corresponds numerically to the said second attribute, if possible;
   c) deriving conspicuous accumulations of the values of an original attribute or an attribute according to b) that are detected in a numerical value or within a numerical interval, a conspicuous accumulation being defined in that it maximizes the quotient of the width of the smaller one of the two gaps immediately adjacent to the numerical interval in which there are no values of the attribute in question, and the width of the largest gap within the numerical interval in which there are no values of the attribute in question;
   d) forming clauses based on conspicuous accumulations as defined in c), said clauses each formulating a logic condition for selecting those examples from the training set whose attribute values of a certain attribute are within a time interval determined according to the characteristics of the associated conspicuous accumulation as defined in c), with each clause being capable of representing a conjunction of plural such selection criteria for different attributes;
   e) constructing a selection of the clauses according to d) for characterizing the entire training set such that all elements, if possible, of the training set are selected by at least one of the clauses, and as many as possible of them by exactly one clause.

* * * * *